United States Patent
Takahashi et al.

(10) Patent No.: US 7,365,845 B2
(45) Date of Patent: Apr. 29, 2008

(54) OPTICAL SPECTRUM ANALYZER

(75) Inventors: Yoshifumi Takahashi, Isehara (JP); Takanori Saitoh, Zama (JP); Kenichi Nakamura, Zama (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 11/338,276

(22) Filed: Jan. 24, 2006

(65) Prior Publication Data
US 2006/0170919 A1    Aug. 3, 2006

(30) Foreign Application Priority Data
Jan. 28, 2005    (JP)    ............... 2005-022068

(51) Int. Cl.
*G01J 3/18* (2006.01)
(52) U.S. Cl. .................. 356/328; 356/326; 702/189
(58) Field of Classification Search ................ 356/328, 356/326; 702/189
See application file for complete search history.

(56) References Cited

U.S. PATENT DOCUMENTS

| | | | |
|---|---|---|---|
| 4,969,740 A | | 11/1990 | Sonobe |
| 5,489,980 A | * | 2/1996 | Anthony ................... 356/308 |
| 5,956,355 A | * | 9/1999 | Swanson et al. ............. 372/20 |
| 6,373,632 B1 | | 4/2002 | Flanders |
| 6,636,306 B2 | * | 10/2003 | He et al. ................... 356/327 |
| 2002/0035449 A1 | * | 3/2002 | Jarman et al. .............. 702/189 |
| 2002/0044280 A1 | | 4/2002 | Weigold et al. |
| 2002/0175287 A1 | | 11/2002 | Busch et al. |
| 2004/0095531 A1 | * | 5/2004 | Jiang et al. ................. 349/115 |

FOREIGN PATENT DOCUMENTS

| | | |
|---|---|---|
| EP | 0 343 659 A1 | 11/1989 |
| JP | 2004-157082 A | 6/2004 |

* cited by examiner

*Primary Examiner*—Layla G. Lauchman
*Assistant Examiner*—Rebecca C Slomski
(74) *Attorney, Agent, or Firm*—Frishauf, Holtz, Goodman & Chick, P.C.

(57) ABSTRACT

An optical spectrum analyzer measures to-be-measured light while carrying out calibration processing for correcting wavelength information of spectrum data of the to-be-measured light by a wavelength information correction device through a storage device based on the spectrum data of reference light that is obtained by causing the reference light whose wavelength is known to be incident on a tunable wavelength filter from light incident devices at all times together with the to-be-measured light. Since the optical spectrum analyzer can continuously measure the to-be-measured light in a wide wavelength range at high speed while maintaining high wavelength accuracy, it can continuously obtain the spectrum data of the to-be-measured light with high wavelength accuracy even if it is installed in a place in which an environment intensely changes.

11 Claims, 10 Drawing Sheets

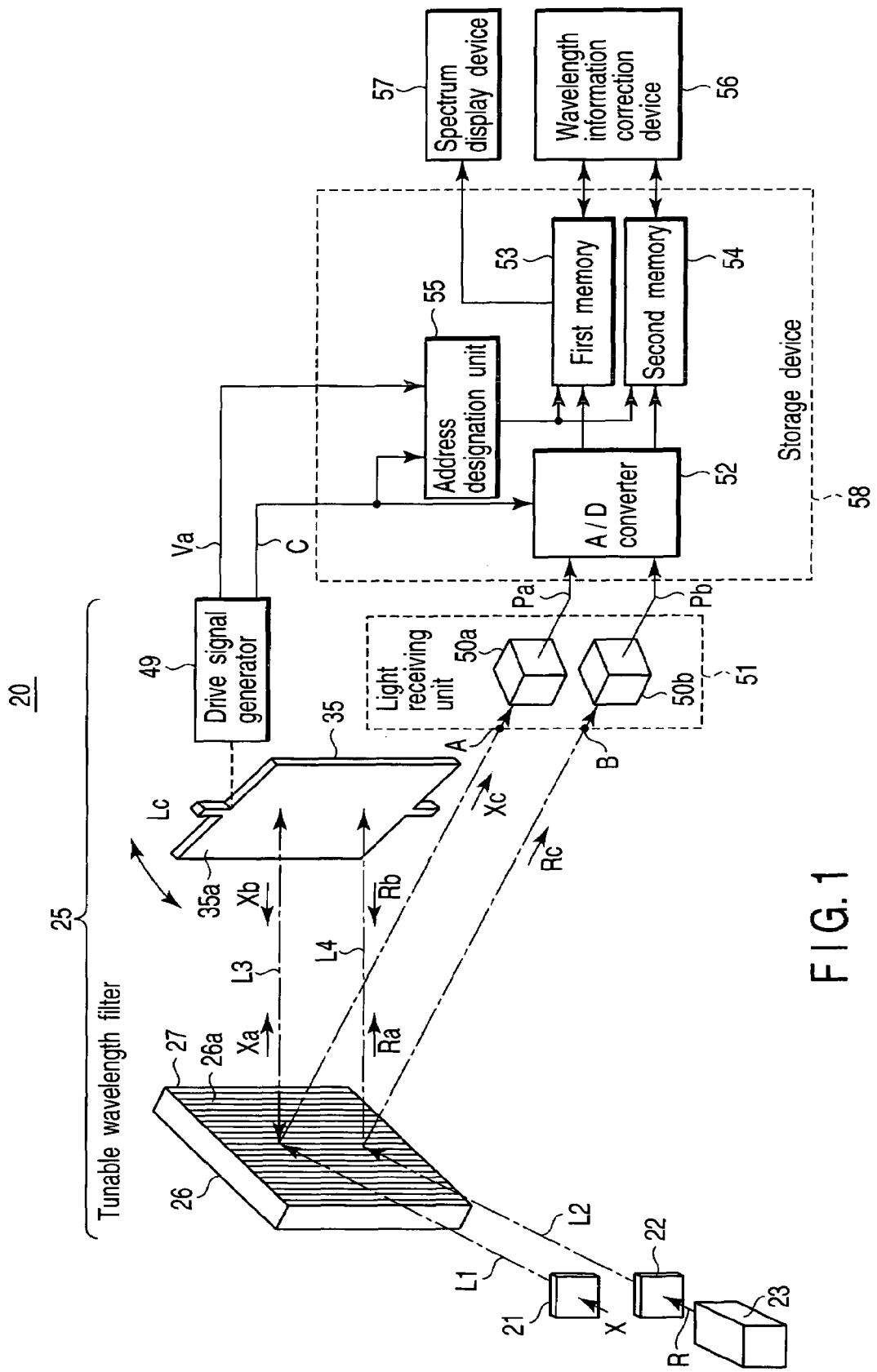
F I G. 1

FIG. 14

OPTICAL SPECTRUM ANALYZER

CROSS-REFERENCE TO RELATED APPLICATIONS

This application is based upon and claims the benefit of priority from prior Japanese Patent Application No. 2005-022068, filed Jan. 28, 2005, the entire contents of which are incorporated herein by reference.

BACKGROUND OF THE INVENTION

1. Field of the Invention

The present invention relates to an optical spectrum analyzer, and more particularly, to an optical spectrum analyzer that employs a technology for improving wavelength accuracy of spectrum characteristics of light when the spectrum characteristics are determined by using a tunable wavelength filter.

2. Description of the Related Art

Optical spectrum analyzers for determining spectrum characteristics of light determine a relation between wavelength and intensity as spectrum characteristics of to-be-measured light, that is, spectrum data by detecting intensity of light that is caused to exit from a tunable wavelength filter on which the to-be-measured light is incident while changing a wavelength selected by the tunable wavelength filter.

It is required as performances of the optical spectrum analyzer that spectrum data as spectrum characteristics to be determined has high wavelength accuracy and high resolution, a wavelength can be measured in a wide range, a wavelength can be swept at high speed, and the like.

These performances of the optical spectrum analyzer are mainly determined by the performance of a tunable wavelength filter used to the optical spectrum analyzer.

A Fairy-Perot filter, which is a kind of a so-called Entaslon, is known as the tunable wavelength filter used conventionally in the optical spectrum analyzer.

As shown in FIG. 16, the Fairy-Perot filter has a so-called cavity configuration in which a pair of optical elements 1 and 2 are arranged in parallel in confrontation with each other, and the light having a wavelength component, which is determined by a gap d between the pair of optical elements 1 and 2, of light Pa incident on the one optical element 1 from the outside is caused to selectively exit to the outside of the other optical element 2.

In the Fairy-Perot filter, a wavelength of the light Pb outgoing from the optical element 2 can be changed by changing the gap d between the pair of optical elements 1 and 2.

In the tunable wavelength filter composed of the Fairy-Perot filter configuration, it is known that a relation of 2nd=mλ (m is integer) is established between the gap d and the wavelength of outgoing light, wherein n denotes a refraction factor of the pair of optical elements 1 and 2.

When the tunable wavelength filter is actually composed of the Fairy-Perot filter having the pair of optical elements 1 and 2, a moving mechanism is necessary to fix one of the pair of optical elements 1 and 2 and to minutely move the other optical element 2 in parallel with the optical element 1 in order to change the gap d between the pair of optical elements 1 and 2.

As the moving mechanism, there is known a moving mechanism as shown in FIG. 17 which is arranged by applying an etching technology, that is, a so-called MEMS (Micro-Electro-Mechanical-systems) technology to a semiconductor substrate and the like (Patent Document 1: U.S. Pat. No. 6,373,632).

In the moving mechanism exemplified in FIG. 17, a disc plate 6 acting as one of a pair of optical elements is formed at the center of a flat frame-shaped substrate 5, and further the inside edge of the substrate 5 is coupled with the outside edge of the disc plate 6 by a plurality (four in FIG. 17) of flexible thin beams 7, 7 . . . that protrude toward each other.

In the moving mechanism, for example, a voltage is applied between the disc plate 6 and a fixed electrode (not shown) confronting the disc plate 6, and the disc plate 6 is moved forward or backward (in a direction orthogonal to the sheet in FIG. 17) by the electrostatic attracting force of the voltage, thereby a gap between the disc plate 6 and a fixed optical element (not shown) acting as the other of the pair of optical elements can be changed.

In an optical spectrum analyzer using the tunable wavelength filter composed of the Fairy-Perot filter, spectrum data of to-be-measured light can be obtained by determining intensity of light, which is selected by the tunable wavelength filter and caused to be incident on a light receiving unit, by the light receiving unit.

However, the optical spectrum analyzer using the Fairy-Perot filter as the tunable wavelength filter has a problem in that a wavelength cannot be increased in a wide range in principle.

More specifically, a wavelength λ of outgoing light is shown by the following equation from a relation between the gap d described above and a wavelength.

$$\lambda = 2nd/m$$

Since outgoing light has a plurality of wavelengths to the same gap d depending on a value of m, the wavelength of the outgoing light cannot be uniquely determined.

FIG. 18 shows a relation between a wavelength the gap d when m=1 to 4.

In FIG. 18, when it is assumed that a desired wavelength is within a range of λ1 to λ2 and the gap is set within a range of d1 to d2 to realize the wavelengths λ1 to λ2 when m=1, three different components having wavelengths 2nd, nd and 2nd/3 are selected with respect to the same gap d when the gap is near to d2.

To prevent the above drawback, the lower limit of the wavelength must be increased from λ1 to λ1'=nd2, by which the wavelength changeable range of the optical spectrum analyzer is restricted because the wavelength changeable range is greatly reduced.

Further, in the optical spectrum analyzer using the Fairy-Perot filter as the tunable wavelength filter, a high degree of parallelism is required to the pair of optical elements to set wavelength selection characteristics within a narrow band.

However, as described above, in the structure in which the disc plate 6, which corresponds to one of the pair of optical elements, is supported through the plurality of thin beams 7, 7 . . . as in the moving mechanism formed by the MEMS exemplified in FIG. 17, the disc plate 6 is inclined even by a minute difference between the plurality of the beams 7, 7 . . . , thereby it is difficult to obtain narrow band characteristics.

To overcome the above problem, since it is necessary to increase the number of electrodes for moving the disc plate 6 to minutely control an attitude of the disc plate 6, thereby a structure is made complex and it is difficult to change a wavelength at high speed.

Further, a problem also arises in that the attitude of the disc plate 6 is liable to be changed in structure by a change of temperature and humidity and accuracy of an outgoing wavelength is deteriorated thereby.

Incidentally, in the optical spectrum analyzer as described above, spectrum data is determined by causing reference light whose wavelength is known to be incident on the tunable wavelength filter in place of the to-be-measured light and the wavelength axis of the spectrum data is calibrated based on the known wavelength of the reference light in order to maintain the accuracy of wavelength of the obtained spectrum data.

However, when the optical spectrum analyzer is used in a place in which an environment is intensely changed, an optical system is changed by the change of the environment, from which a problem may arise in that the accuracy of wavelength of the obtained spectrum data is greatly deteriorated.

Accordingly, the optical spectrum analyzer itself must be calibrated frequently, from which a problem arises in that it is difficult to continuously measure to-be-measured light that is to be continuously measured intrinsically.

BRIEF SUMMARY OF THE INVENTION

To solve the problems of the prior arts as described above, an object of the present invention is to provide an optical spectrum analyzer that can continuously measure to-be-measured light in a wide wavelength range at high speed while maintaining high wavelength accuracy by measuring the to-be-measured light accompanied with calibration processing for correcting wavelength information based on spectrum data obtained by causing reference light whose wavelength is known to be incident on a tunable wavelength filter at all times together with the to-be-measured light.

In order to achieve the above object, according to a first aspect of the present invention, there is provided an optical spectrum analyzer comprising:

a tunable wavelength filter (25) which causes wavelength components contained in incident light to selectively exit therefrom as well as changes the selected wavelength as time passes;

a reference light source (23) which radiates reference light (R) whose wavelength in which light intensity is maximized or minimized is known;

light incident devices (21, 22) which cause to-be-measured light (X) to be incident on the tunable wavelength filter (25) along a first optical axis (L1) and at the same time cause the reference light (R) from the reference light source (23) to be incident on the tunable wavelength filter (25) along a second optical axis (L2) different from the first optical axis (L1);

a light receiving device (51) which simultaneously receives light (Xc), which results from the to-be-measured light (X) and is caused to exit from the tunable wavelength filter (25), and light (Rc), which results from the reference light (R) and is caused to exit from the tunable wavelength filter (25) as well as simultaneously outputs an output signal in response to the to-be-measured light (X) and an output signal in response to the reference light (R);

a storage device (58) which stores spectrum data of the to-be-measured light (X) and spectrum data of the reference light (R) based on the output signal in response to the to-be-measured light (X) and the output signal in response to the reference light (R) which are simultaneously output from the light receiving device (51) while causing the spectrum data to correspond to the wavelength that is selected by the tunable wavelength filter (25) and changes as time passes; and a correction device (56) which corrects the spectrum data of the to-be-measured light (X) stored in the storage device (58) by using the spectrum data of the reference light (R) stored in the storage device (58) based on a wavelength that is selected by the tunable wavelength filter (25) and changes as time passes.

In order to achieve the above object, according to a second aspect of the present invention, there is provided an optical spectrum analyzer according to the first aspect, wherein the tunable wavelength filter (25) has:

a diffraction grating (26, 26A, 26B) which receives the to-be-measured light (X) and the reference light (R) in a direction orthogonal to grooves of a diffraction surface and diffracts the to-be-measured light (X) and the reference light (R); and a turning mirror (35) having a reflection surface (35a, 35b) that confronts the diffraction surface of the diffraction grating (26, 26A, 26B), the turning mirror (35) being formed to be free to turn about an axis parallel to the grooves of the diffraction surface, receiving diffracted light that is caused to exit from the diffraction grating (26, 26A, 26B) in response to the to-be-measured light (X) and to the reference light (R) on the reflection surface, and returning the diffracted light to the diffraction grating (26, 26A, 26B), and the light receiving device (51) has:

a first light receiving unit (50a) which receives light (Xc) that is caused to exit from the diffraction grating (26, 26A, 26B) in a first specific direction (A) in response to light (Xb) resulting from the to-be-measured light (X) and returned from the turning mirror (35); and a second light receiving unit (50b) which receives light (Rc) that is caused to exit from the diffraction grating (26, 26A, 26B) in a second specific direction (B) in response to light (Rb) resulting from the reference light (R) and returned from the turning mirror (35).

In order to achieve the above object, according to a third aspect of the present invention, there is provided an optical spectrum analyzer according to the second aspect, wherein the turning mirror (35) has:

a mirror main body (36);

fixed substrates (38, 39);

torsion bars (37) which couple between the edges of the fixed substrates (38, 39) and the outside edges of the mirror main body (36), the torsion bars (37) being twisted and deformed in a lengthwise direction, and turnably supporting the mirror main body (36); and turning means (40, 44, 45, 49) for turning the mirror main body (36).

In order to achieve the above object, according to a fourth aspect of the present invention, there is provided an optical spectrum analyzer according to the second aspect, wherein the turning mirror (35) has reflection surfaces formed on one surface side and an opposite surface side, and the diffraction grating (26, 26A, 26B) comprises:

a first diffraction grating (26A) which receives the to-be-measured light (X) incident thereon from a first light incident unit (21) of the light incident devices (21, 22) and causes diffracted light (Xa) resulting from the to-be-measured light (X) on the one surface side of the turning mirror (35); and a second diffraction grating (26B) which receives the reference light (R) incident thereon from a second light incident unit (22) of the light incident devices (21, 22) and causes diffracted light (Ra) resulting from the reference light (R) to be incident on the opposite surface side of the turning mirror (35).

In order to achieve the above object, according to a fifth aspect of the present invention, there is provided an optical spectrum analyzer according to the third aspect, wherein the turning mirror (35) has reflection surfaces formed on one surface side and an opposite surface side, and the diffraction grating (26, 26A, 26B) comprises:

a first diffraction grating (26A) which receives the to-be-measured light (X) incident thereon from a first light incident unit (21) of the light incident devices (21, 22) and causes diffracted light (Xa) resulting from the to-be-measured light (X) to be incident on the one surface side of the turning mirror (35); and a second diffraction grating (26B) which receives the reference light (R) incident thereon from a second light incident unit (22) of the light incident devices (21, 22) and causes diffracted light (Ra) resulting from the reference light (R) to be incident on the opposite surface side of the turning mirror (35).

In order to achieve the above object, according to a sixth aspect of the present invention, there is provided an optical spectrum analyzer according to the first aspect, wherein the reference light source (23) comprises:

a wide band light source (23a) which radiates wide band light (W); and a filter (23b) which receives the wide band light (W) from the wide band light source (23a) and extracts a plurality of light components whose peak level wavelengths are known.

In order to achieve the above object, according to a seventh aspect of the present invention, there is provided an optical spectrum analyzer according to the second aspect, wherein the reference light source (23) comprises:

a wide band light source (23a) which radiates wide band light (W); and a filter (23b) which receives the wide band light (W) from the wide band light source (23a) and extracts a plurality of light components whose peak level wavelengths are known.

In order to achieve the above object, according to an eighth aspect of the present invention, there is provided an optical spectrum analyzer according to the third aspect, wherein the reference light source (23) comprises:

a wide band light source (23a) which radiates wide band light (W); and a filter (23b) which receives the wide band light (W) from the wide band light source (23a) and extracts a plurality of light components whose peak level wavelengths are known.

In order to achieve the above object, according to a ninth aspect of the present invention, there is provided an optical spectrum analyzer according to the fourth aspect, wherein the reference light source (23) comprises:

a wide band light source (23a) which radiates wide band light (W); and a filter (23b) which receives the wide band light (W) from the wide band light source (23a) and extracts a plurality of light components whose peak level wavelengths are known.

In order to achieve the above object, according to a tenth aspect of the present invention, there is provided an optical spectrum analyzer according to the fifth aspect, wherein the reference light source (23) comprises:

a wide band light source (23a) which radiates wide band light (W); and a filter (23b) which receives the wide band light (W) from the wide band light source (23a) and extracts a plurality of light components whose peak level wavelengths are known.

In order to achieve the above object, according to an eleventh aspect of the present invention, there is provided an optical spectrum analyzer according to the first aspect, wherein the reference light source (23) comprises:

a wide band light source (23a) which radiates wide band light (W); and a gas absorption cell (23c) which receives the wide band light (W) from the wide band light source (23a), absorbs light whose wavelength is known, and causes the light to exit therefrom.

In order to achieve the above object, according to a twelfth aspect of the present invention, there is provided an optical spectrum analyzer according to the second aspect, wherein the reference light source (23) comprises:

a wide band light source (23a) which radiates wide band light (W); and a gas absorption cell (23c) which receives the wide band light (W) from the wide band light source (23a), absorbs light whose wavelength is known, and causes the light to exit therefrom.

In order to achieve the above object, according to a thirteenth aspect of the present invention, there is provided an optical spectrum analyzer according to the third aspect, wherein the reference light source (23) comprises:

a wide band light source (23a) which radiates wide band light (W); and a gas absorption cell (23c) which receives the wide band light (W) from the wide band light source (23a), absorbs light whose wavelength is known, and causes the light to exit therefrom.

In order to achieve the above object, according to a fourteenth aspect of the present invention, there is provided an optical spectrum analyzer according to the fourth aspect, wherein the reference light source (23) comprises:

a wide band light source (23a) which radiates wide band light (W); and a gas absorption cell (23c) which receives the wide band light (W) from the wide band light source (23a), absorbs light whose wavelength is known, and causes the light to exit therefrom.

In order to achieve the above object, according to a fifteenth aspect of the present invention, there is provided an optical spectrum analyzer according to the fifth aspect, wherein the reference light source (23) comprises:

a wide band light source (23a) which radiates wide band light (W); and a gas absorption cell (23c) which receives the wide band light (W) from the wide band light source (23a), absorbs light whose wavelength is known, and causes the light to exit therefrom.

In order to achieve the above object, according to a sixteenth aspect of the present invention, there is provided an optical spectrum analyzer according to the second aspect, wherein the reference light source (23) comprises:

a plurality of narrow band light sources (23d) which radiate a plurality of single wavelength light beams whose wavelength is known, respectively; and a light coupler (23e) which couples the single wavelength light beams radiated from said plurality of narrow band light sources (23d) and causes a coupled light to exit therefrom.

In order to achieve the above object, according to a seventeenth aspect of the present invention, there is provided an optical spectrum analyzer according to the third aspect, wherein the reference light source (23) comprises:

a plurality of narrow band light sources (23d) which radiate a plurality of single wavelength light beams whose wavelength is known, respectively; and a light coupler (23e) which couples the single wavelength light beams radiated from said plurality of narrow band light sources (23d) and causes a coupled light to exit therefrom.

In order to achieve the above object, according to an eighteenth aspect of the present invention, there is provided an optical spectrum analyzer according to the fourth aspect, wherein the reference light source (23) comprises:

a plurality of narrow band light sources (23d) which radiate a plurality of single wavelength light beams whose wavelength is known, respectively; and a light coupler (23e) which couples the single wavelength light beams radiated from said plurality of narrow band light sources (23d) and causes a coupled light to exit therefrom.

In order to achieve the above object, according to a nineteenth aspect of the present invention, there is provided an optical spectrum analyzer according to the fifth aspect, wherein the reference light source (23) comprises:

a plurality of narrow band light sources (23d) which radiate a plurality of single wavelength light beams whose wavelength is known, respectively; and a light coupler (23e) which couples the single wavelength light beams radiated from said plurality of narrow band light sources (23d) and causes a coupled light to exit therefrom.

In order to achieve the above object, according to a twentieth aspect of the present invention, there is provided an optical spectrum analyzer according to the first aspect, wherein the storage device (58) includes:

an analog/digital (A/D) converter (52) which converts first and second intensity signals (Pa, Pd), which are output from the first light receiving unit (50a) and the second light receiving unit (50b) in correspondence to the intensities of respective incident light beams, to first and second digital signal trains (Da, Db);

first and second memories (53, 54) which store the first and second digital signal trains (Da, Db) converted by the A/D converter (52) in time series; and an address designation unit (55) which designates address values (Am) to the first and second memories (53, 54), and the address destination unit (55) counts the number of clock signals (C) from a timing at which a drive signal (Va or Vb) that drives the tunable wavelength filter (25) rises to a timing at which it falls, and outputs a result of count as the address values (Am).

In order to achieve the above object, according to a twenty-first aspect of the present invention, there is provided an optical spectrum analyzer according to the third aspect, wherein the mirror main body (36) constituting the turning mirror (35), the fixed substrates (38, 39), and the torsion bars (37) are formed by a micro-electro-mechanical-systems (MEMS) for subjecting a single semiconductor substrate to etching processing.

In the optical spectrum analyzers according to the first to twentieth aspects of the present invention configured as described above, the to-be-measured light is measured accompanied with the calibration processing for correcting the wavelength information of the spectrum data of the to-be-measured light based on the spectrum data of the reference light that is obtained by causing the reference light having the known wavelength to be incident on the tunable wavelength filter at all times together with the to-be-measured light. As a result, since the to-be-measured light can be continuously measured in the wide wavelength range at the high speed while maintaining the high wavelength accuracy, there are obtained such advantages that spectrum data of the to-be-measured light having the high wavelength accuracy can be continuously obtained even if the optical spectrum analyzer is installed in a place in which an environment intensely changes.

Further, the optical spectrum analyzer according to the twenty-first aspect of the present invention has such advantages that control can be easily carried out and the wavelength can be changed in a wide range at high speed because the diffraction grating and the turning mirror having the so-called MEMS structure are used as the tunable wavelength filter, in addition to the advantages of the optical spectrum analyzers according to the first to twentieth aspects of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the present invention.

FIG. 1 is a block diagram shown to explain a configuration of an optical spectrum analyzer according to a first embodiment of the present invention;

FIG. 14 is a block diagram shown to explain a configuration of an optical spectrum analyzer according to a fourth embodiment of the present invention;

DETAILED DESCRIPTION OF THE INVENTION

Figure 2:
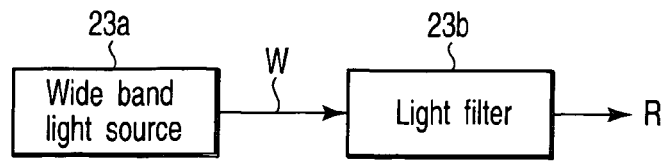
FIG. 2 is a block diagram shown to explain a configuration of an example of a reference light source for use in the optical spectrum analyzer of FIG. 1.

Reference will now be made in detail to the embodiments of the invention as illustrated in the accompanying drawings, in which like reference numerals designate like or corresponding parts.

Several embodiments of the present invention will be explained below with reference to the accompanying drawings.

First Embodiment

FIG. 1 is a block diagram shown to explain an overall configuration of an optical spectrum analyzer 20 according to a first embodiment of the present invention.

That is, the optical spectrum analyzer of the present invention basically includes a tunable wavelength filter 25, a reference light source 23, light incident devices 21 and 22, a light receiving device 51, a storage device 58, and a correction device 56. The tunable wavelength filter 25 causes wavelength components contained in incident light to selectively exit therefrom as well as changes the selected wavelength as time passes. The reference light source 23 radiates reference light R whose wavelength in which light intensity is maximized or minimized is known. The light incident devices 21 and 22 cause to-be-measured light X to be incident on the tunable wavelength filter 25 along a first optical axis L1 and at the same time cause the reference light R from the reference light source 23 to be incident on the tunable wavelength filter 25 along a second optical axis L2 different from the first optical axis L1. The light receiving device 51 simultaneously receives light Xc, which results from the to-be-measured light X and is caused to exit from the tunable wavelength filter 25, and light Rc, which results from the reference light R and is caused to exit from the tunable wavelength filter 25 as well as simultaneously outputs an output signal in response to the to-be-measured light X and an output signal in response the reference light R. The storage device 58 simultaneously stores spectrum data of the to-be-measured light X and spectrum data of the reference light R based on the output signal in response to the to-be-measured light X and the output signal in response to the reference light R which are simultaneously output from the light receiving device 51 while causing the spectrum data to correspond to the wavelength that is selected by the tunable wavelength filter 25 and changes as time passes. The correction device 56 corrects the spectrum data of the to-be-measured light X stored in the storage device 58 by using the spectrum data of the reference light R stored in the storage device 58 based on a wavelength that is selected by the tunable wavelength filter 25 and changes as time passes.

Specifically, in the optical spectrum analyzer 20 configured as shown in FIG. 1, a first light incident device 21 causes the to-be-measured light X to be incident on the tunable wavelength filter 25, which will be described later, along the first optical axis L1.

Further, a light incident device 22 causes the reference light R from the reference light source 23, which will be described later, to be incident on the tunable wavelength filter 25 along the second optical axis L2 different from the first optical axis L1.

Each of the first and second light incident devices 21 and 22 is composed of, for example, an optical fiber connector, a collimate lens, and the like.

The reference light source 23 radiates the reference light R whose wavelength in which light intensity is maximized or minimized is known within a wavelength changeable range of the tunable wavelength filter 25.

Figure 3:
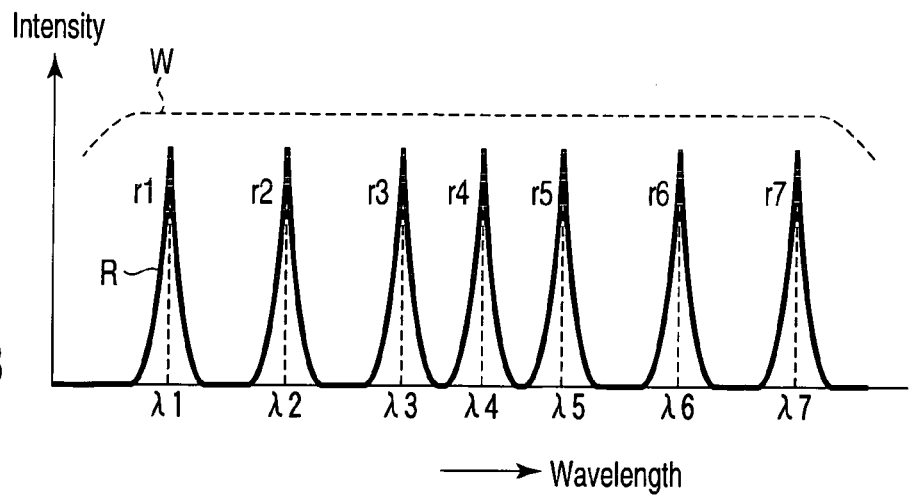
FIG. 3 is a view shown to explain an example of a spectrum output from the reference light source of FIG. 2.

As shown in, for example, FIG. 2, the reference light source 23 is composed of a wide band light source 23a for radiating wide band light W and a light filter 23b for receiving the wide band light W from the wide band light source 23a and extracting a plurality of light components r1, r2, . . . r7 whose wavelengths $\lambda(1), \lambda(2), \ldots \lambda(7)$ of respective peak levels are known as shown in FIG. 3 as an example of the reference light source 23.

Note that the wide band light source 23a is composed of, for example, a super luminance diode (SLD) light source, an amplified spontaneous emission (ASE) light source and the like.

Further, the light filter 23b is composed of Etalon described above, a Fiber Bragg Grating (FBG), and the like.

Figure 4:
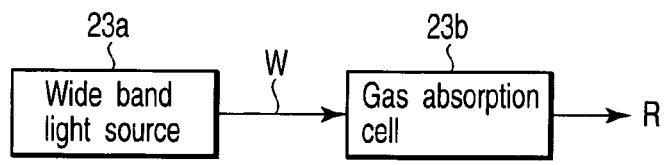
FIG. 4 is a block diagram shown to explain a configuration of a modification of the reference light source for use in the optical spectrum analyzer of FIG. 1.
Figure 5:
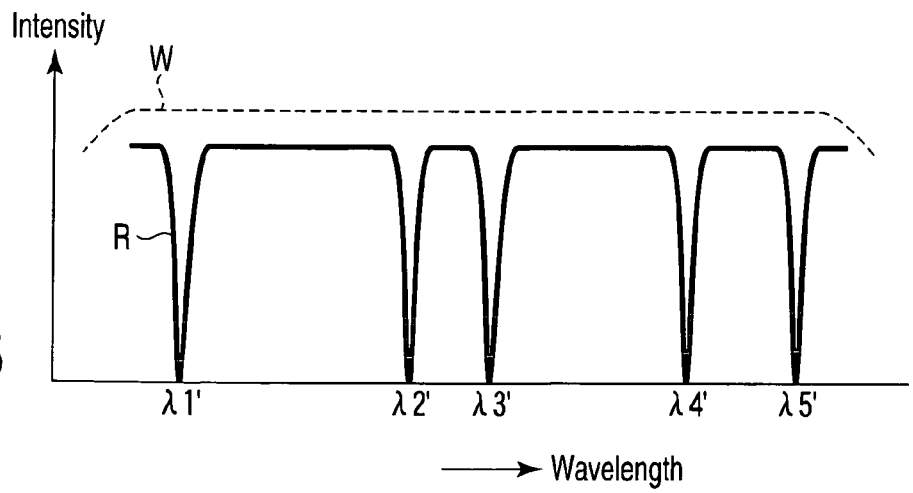
FIG. 5 is a view shown to explain an example of a spectrum output from the reference light source of FIG. 4.

Further, a modification of the reference light source 23 may be composed of the wide band light source 23a and a gas absorption cell 23c. In the modification, the gas absorption cell 23c receives the wide band light W radiated from the wide band light source 23a as shown in FIG. 4, absorbs light having a plurality of known wavelength $\lambda(1'), \lambda(2'), \ldots \lambda(5')$, and causes light whose wavelength in which light intensity is minimized is known to exit therefrom as shown in FIG. 5.

Figure 6:
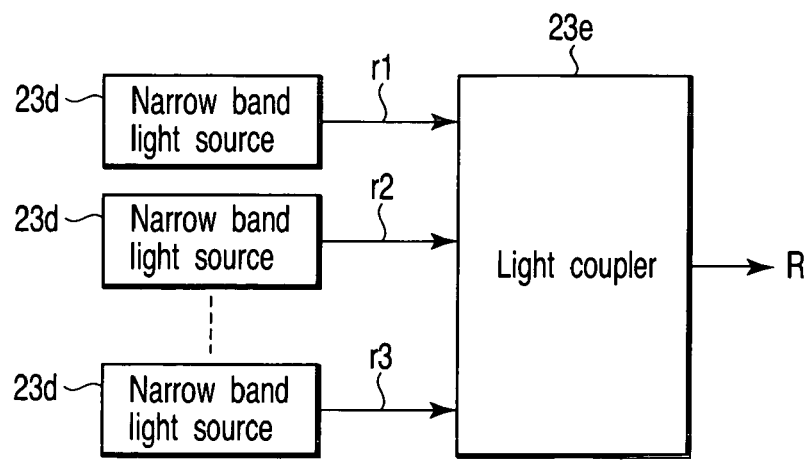
FIG. 6 is a block diagram shown to explain a configuration of another modification of the reference light source for use in the optical spectrum analyzer of FIG. 1.

In addition, another modification of the reference light source 23 may be composed of a plurality of narrow band light sources (for example, semiconductor lasers) 23d, 23d, . . . for radiating single wavelength light beams having known wavelengths $\lambda(1), \lambda(2), \ldots \lambda(N)$, respectively, and a light coupler 23e for coupling the single wavelength light beams radiated therefrom and causing a coupled light beam to exit therefrom as shown in FIG. 6.

The tunable wavelength filter 25 selectively causes the wavelength components contained in the incident light to exist therefrom as well as includes a diffraction grating 26, a turning mirror 35, and a drive signal generator 49, which will be described later, as a mechanism for changing a selected wavelength of the wavelength component.

The diffraction grating 26 has a plurality of grooves 27 formed in parallel with each other on a grating surface 26a thereof. Therefore, the diffraction grating 26 can receive the to-be-measured light X, which is incident thereon from the first light incident device 21 along the first optical axis L1, and the reference light R, which is incident thereon from the light incident device 22 along the second optical axis L2, in a direction orthogonal to the grooves 27 of the grating surface 26a and cause the respective diffracted light beams to exit therefrom.

It is assumed here that the first optical axis L1 and the second optical axis L2 are parallel to each other as well as located in a plane having one groove 27 on the grating surface 26a.

In this case, the diffraction grating 26 causes the wavelength components included in the incident light to exist therefrom at angles corresponding to the wavelengths of the wavelength components, respectively.

However, when the to-be-measured light X and the reference light R are incident on the grating surface 26a at the same angle as in this case, diffracted light beams Xa, Ra having the same wavelength component of the wavelength components contained in the to-be-measured light X and the wavelength components contained in the reference light R are caused to exit from the grating surface 26a at the same exiting angle along light axes L3 and L4 offset in parallel in the lengthwise direction of the grooves 27 and incident on the turning mirror 35.

The turning mirror 35 has a reflection surface 35a confronting the grating surface 26a of the diffraction grating 26 as well as is formed to be free to turn about an axis Lc parallel to the grooves 27 of the grating surface 26a.

With this configuration, the turning mirror 35 returns the diffracted light beams Xa, Ra, which are orthogonal to the reflection surface 35a, of the diffracted light beams, which result from the to-be-measured light X and the reference light R and are caused to exit from the diffraction grating 26, to the diffraction grating 26 along the same light axes L3 and L4 along which the diffracted light beams Xa, Ra are incident on the turning mirror 35 as inverse return light beams Xb, Rb.

The return light beams Xb, Rb are caused to be incident on the diffraction grating 26 and to be exit therefrom at angles determined by the incident angles and the wavelengths thereof.

When the angle of the turning mirror 35 changes, the wavelengths of the diffracted light beams Xa, Ra orthogonal to the reflection surface 35a and the angles of the return light beams Xb, Rb at which they are incident on the diffraction grating 26 change.

However, in this case, even if the angle of the turning mirror 35 changes with respect to the diffraction grating 26, the angles at which diffracted light beams Xc, Rc, which result from the return light Xb and Rb and are caused to exit from the diffraction grating 26, are not changed by appropriately setting the position of the turning mirror 35 with respect to the diffraction grating 26.

In contrast, the turning mirror 35 is formed small in size and light in weight with pinpoint dimensional accuracy by a so-called MEMS (Micro-Electro-Mechanical-Systems) technology making use of an etching technology applied to, for example, a semiconductor substrate composed of silicon and the like.

Figure 7:
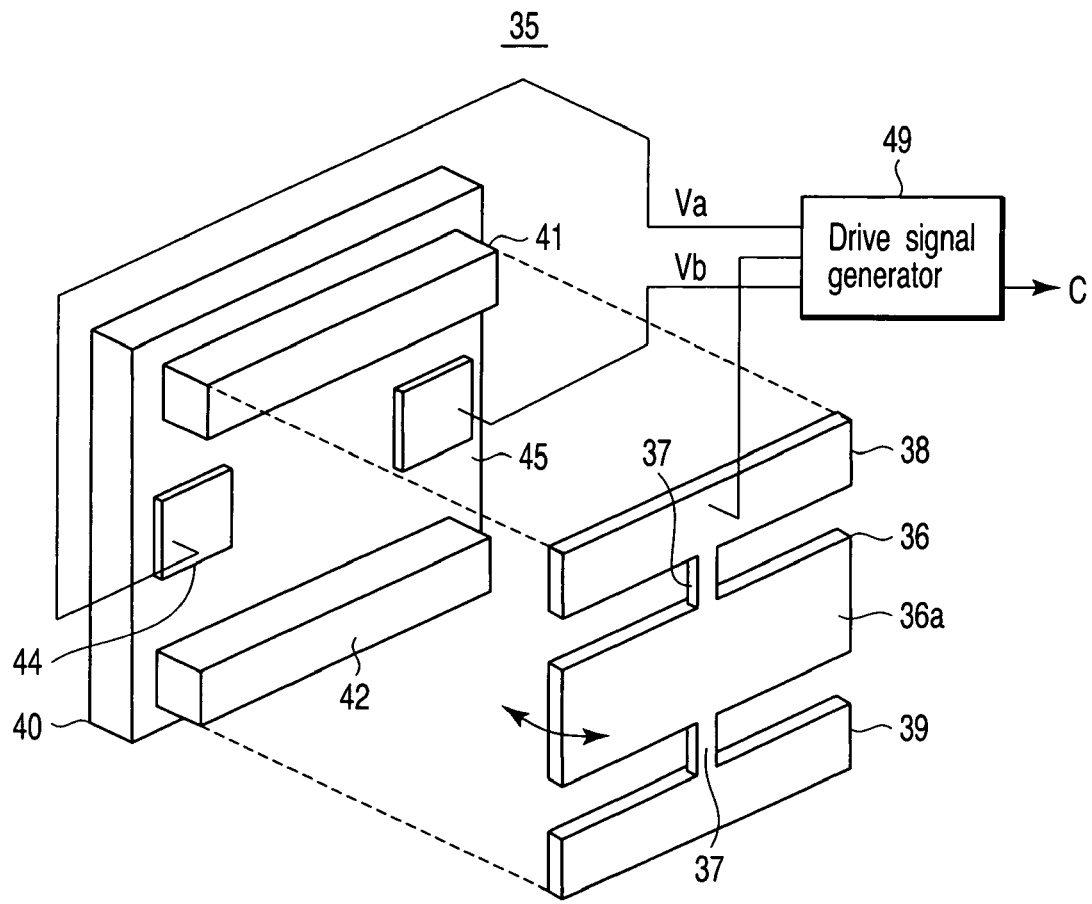
FIG. 7 is an exploded perspective view shown to explain a configuration of an example of a movable mirror for use in a tunable wavelength filter of the optical spectrum analyzer of FIG. 1.

FIG. 7 is an exploded perspective view for explaining a configuration of an example of the turning mirror 35 which is used to the tunable wavelength filter 25 of the optical spectrum analyzer 20 shown in FIG. 1 and formed by the MEMS technology as described above.

In FIG. 7, a mirror main body 36 is formed in a laterally-long rectangular flat shape making use of the etching technology to the semiconductor substrate composed of, for example, silicon and the like and has a reflection surface 36a formed on one surface thereof.

Laterally-long rectangular fixed substrates 38, 39 are arranged above and below the mirror main body 36 in parallel to each other.

The center of the lower edge of the upper fixed substrate 38 is coupled with the center of the upper edge of the mirror main body 36 and the center of the upper edge of the lower fixed substrate 39 is coupled with the center of the lower edge of the mirror main body 36, respectively by a pair of upper and lower torsion bars 37, 37 arranged linearly each other.

The width and the thickness of the pair of torsion bars 37, 37 are set such that the torsion bars 37, 37 can be twisted and deformed within the range of a desired turning angle in a lengthwise direction and can be returned from the deformed state.

The twisting deformation of the pair of upper and lower torsion bars 37, 37 permits the mirror main body 36 to reciprocatingly turn with respect to the fixed substrates 38, 39 by using the pair of upper and lower torsion bars 37, 37 as support torsion bars.

Note that, in this case, a block composed of the mirror main body 36, the pair of torsion bars 37, 37, and the fixed substrates 38, 39 can be formed by subjecting a single semiconductor substrate to the etching processing, and thus, the thickness of the pair of upper and lower torsion bars 37, 37 is common to the thickness of the mirror main body 36 and the fixed substrates 38, 39.

In the block in which the mirror main body 36, the pair of upper and lower torsion bars 37, 37, and the fixed substrates 38, 39 are formed integrally with each other, at least the mirror main body 36 has conductivity so that it electrostatically applies a rotation drive force between electrode plates 44, 45 which will be described later.

Note that the mirror main body 36 may be turnably supported in the inside of a single fixed substrate, which is formed in a frame shape by coupling both the ends of the fixed substrates 38, 39, through the two torsion bars 37, in place of the above two fixed substrates 38, 39 separated from each other.

The fixed substrates 38, 39 are fixed on spacers 41, 42 arranged on one surface of an insulation support substrate 40 so as to overlap thereon.

Further, the electrode plates 44, 45 are fixed on one surface of the support substrate 40 at the positions thereof confronting both the ends of the back surface of the mirror main body 36.

Figure 8:
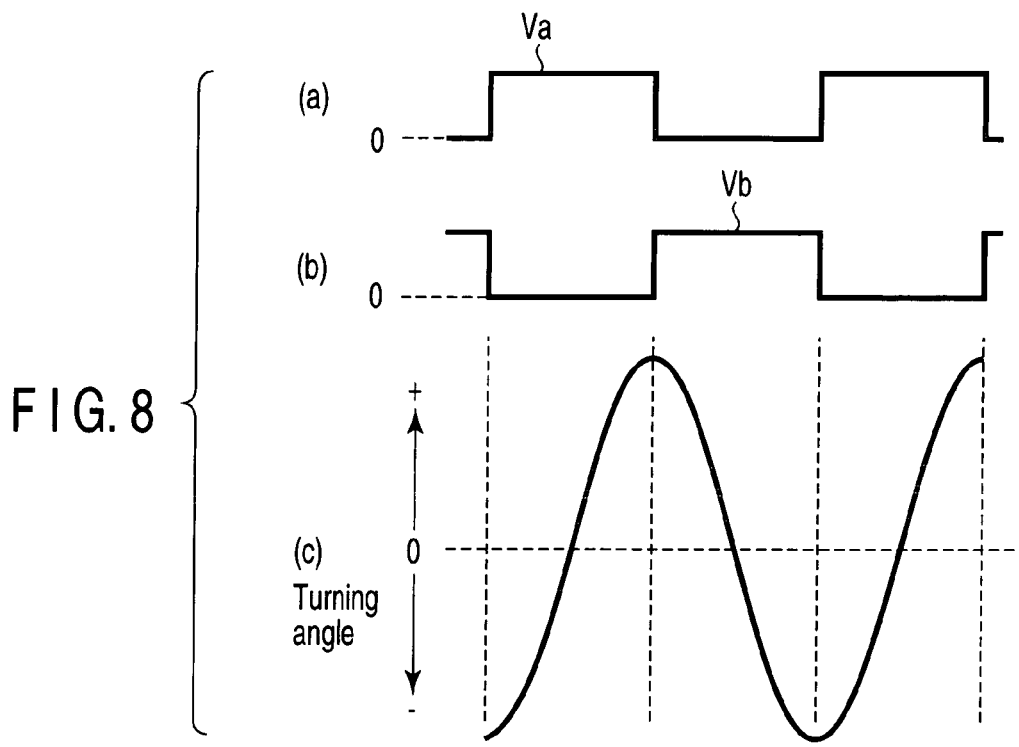
FIGS. 8A to 8C are timing charts shown to explain a correspondence relation between a wavelength sweep drive signal, which is issued by a drive signal generator to drive the movable mirror of FIG. 7, and an angular change.

As shown in, for example, FIGS. 8A and 8B, drive signals Va, Vb whose voltage levels are in an inverse relation are periodically applied from the drive signal generator 49 between the pair of electrode plates 44, 45 and the block including the mirror main body 36.

With this operation, an electrostatic attracting force is alternately generated between the electrode plates 44, 45 and both the ends of the back surface of the mirror main body 36, thereby the mirror main body 36 is reciprocatingly turned substantially sinusoidally as shown in, for example, FIG. 8C.

Note that the drive signals Va, Vb can be obtained by dividing clock signals C generated by the drive signal generator 49 also shown in, for example, FIG. 1 and having a high frequency.

When the frequency of the signals Va, Vb is set to a value corresponding to the eigenfrequency of the mirror main body 36 determined by the shape and the weight of the mirror main body 36, the spring constant of the torsion bars 37 and the like, a large turning amplitude can be applied to the mirror main body 36 by a small amount of drive power.

As described above, the turning mirror 35 is formed very small in size and very light in weight in its entirety including the mirror main body 36 with pinpoint accuracy by the MEMS technology as well as there is no element for restricting the shape of the mirror main body 36.

Accordingly, since the turning mirror 35 can be formed right-left symmetrically with respect to the pair of upper and lower torsion bars 37, 37 as in the example shown in FIG. 7, the mirror main body 36 can be reciprocatingly turned at high speed at several hundreds to several tens of hertz, thereby a wavelength can be swept at high speed.

Further, an operation mode, in which the turning mirror 35 is stopped temporarily at an arbitrary angle, can be realized by applying a predetermined voltage to any one of the electro plates from the drive signal generator 49, and the angle of the turning mirror 35 can be changed by changing the predetermined voltage.

Note that the structure of the turning mirror 35 is not restricted to the one described above and may be modified to various shapes.

In addition, the drive system of the turning mirror 35 is not restricted to the system employing the electrostatic force, and a magnetic force obtained by a magnet and a coil may be used as well as a mechanical force may be applied by using a piezoelectric element and the like.

Returning to FIG. 1, the diffracted light Xc, which results from the return light Xb caused to exit from the thus configured turning mirror 35 and is caused to exit from the diffraction grating 26 in a first specific direction A, is incident on a first light receiving unit 50a.

Further, the diffracted light Rc, which results from the return light Rb and is caused to exit from the diffraction grating 26 in a second specific direction B (in this case, parallel to the first specific direction A), is incident on a second light receiving unit 50b.

The first and second light receiving units 50a and 50b constitute the light receiving device 51 in the present invention.

The first and second light receiving units 50a and 50b output intensity signals Pa, Pb corresponding to the intensities of the light beams incident thereon.

The intensity signals Pa, Pb are stored in first and second memories 53, 54 in time series after they are converted into digital signal trains Da, Db by a 2-channel analog to digital (A/D) converter 52.

An address designation unit 55 designates address values Am to the first and second memories 53 and 54.

The address designation unit 55 receives the clock signals C output from the drive signal generator 49 and the drive signal Va (which may be the drive signal Vb) to drive the tunable wavelength filter 25, counts the number of the clock signals C from a timing at which the drive signal Va rises to a timing at which it falls, and outputs a result of count as the address values Am.

Note that the A/D converter 52, the first and second memories 53, 54, and the address designation unit 55 constitute a storage device 58 of the present invention.

The wavelength information correction device 56 carries out correction processing to the wavelength information of the spectrum data obtained to the to-be-measured light X based on the spectrum data obtained to the reference light R and a known wavelength.

Various methods are contemplated as the mode of the correction processing.

Figure 9:
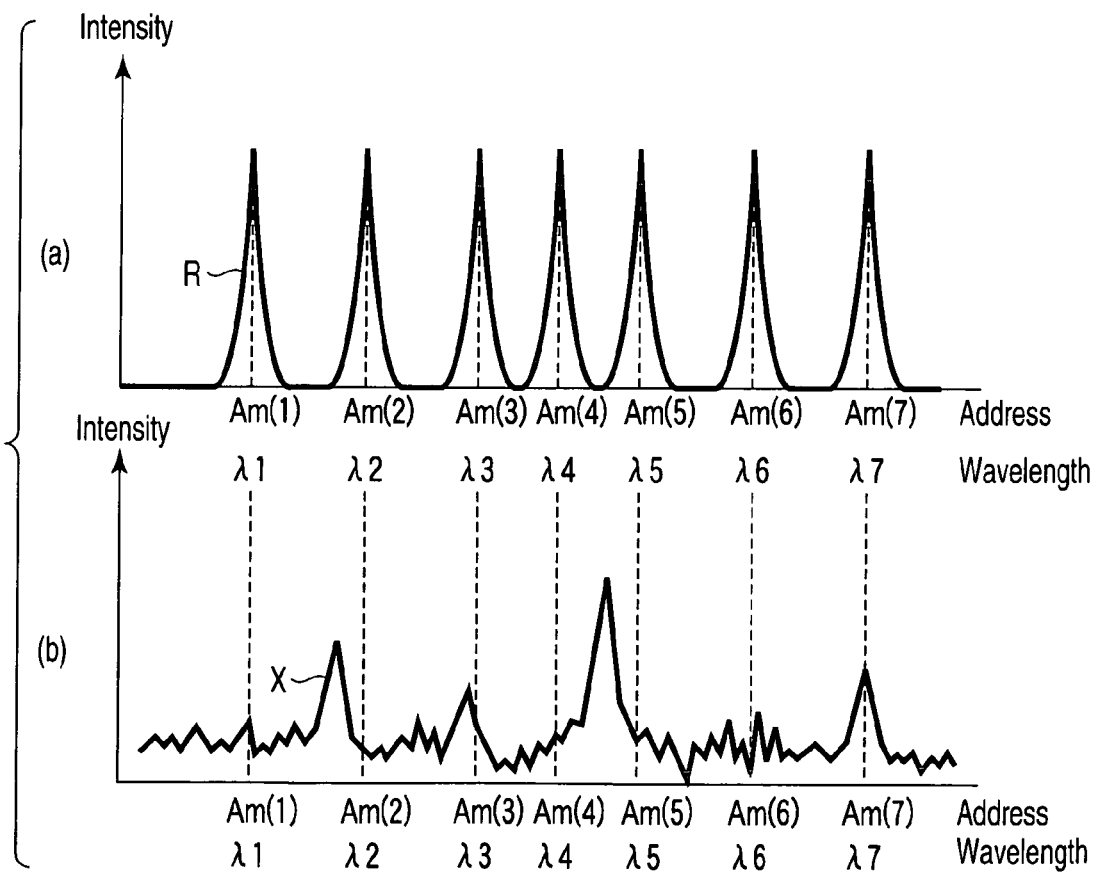
FIGS. 9A and 9B are spectrum views shown to explain wavelength information correction processing carried out by a wavelength information correction device of the optical spectrum analyzer of FIG. 1.

In a simplest correction processing method, as shown in FIG. 9A, the wavelength information correction device 56 first determines address values Am(1), Am(2), . . . of the points at which the intensities of the spectrum data of the reference light R stored in the second memory 54 are maximized and assumes that the address values Am(1), Am(2), . . . correspond to the known wavelengths λ(1), λ(2), . . . .

Subsequently, the wavelength information correction device 56 determines an amount of change of wavelength per 1 point of address by dividing a wavelength difference Δλ(i)=λ(i+1)−λ(i) by an address difference Ai=Am(i+1)−Am(i) and carries out interpolation processing for allocating a wavelength to the respective addresses between the addresses Am(i) and Am(i+1).

A relation between the respective address values Am(1), Am(2), . . . of the second memory 54 and the respective wavelengths λ(1), λ(2), . . . is determined by the correction processing.

As described above, the reference light R and the to-be-measured light X are incident on the diffraction grating 26 of the tunable wavelength filter 25 at the same angle as well as the first and second light receiving units 50a and 50b are arranged in the direction at the same angle to the diffraction grating 26. Thus, the information of address vs wavelength obtained to the reference light R can be also applied to the first memory 53 as it is.

Accordingly, as shown in FIG. 9B, when the spectrum data of the to-be-measured light X stored in the first memory 53 is read out by a spectrum display device 57, a spectrum waveform of the to-be-measured light X can be displayed on an accurate wavelength axis by applying the information of address vs wavelength obtained by the wavelength information correction device 56 to the spectrum display device 57.

The wavelength correction processing executed by the wavelength information correction device 56 can be carried out every time a wavelength is swept. Consequently, even if the optical spectrum analyzer is installed in a place in which an environment changes intensively, accurate spectrum data of the to-be-measured light, in which the wavelength information is calibrated at all times, can be obtained.

Note that, actually, the wavelength correction processing need not be carried out unconditionally every time a wavelength is swept.

For example, the information of address vs wavelength may be determined from the spectrum data obtained to the reference light R in a first sweep and it may be determined whether or not the corresponding relation between the address value Am(1) and the known wavelength λ(1) described above changes in second and subsequent sweeps. When the corresponding relation does not change, the information of address vs wavelength may not be updated.

The wavelength correction processing carried out by the wavelength information correction device 56 can be also realized by a feedback control to the address designation unit 55 or the drive signal generator 49, in addition to the method of updating the information of address vs wavelength as described above.

When, for example, the feedback control is carried out to the address designation unit 55 or the drive signal generator 49, the wavelength information correction device 56 determines the information of address vs wavelength from the spectrum data obtained to the reference light R in a first sweep and determines whether or not the corresponding relation between the address value Am(1) and the known wavelength λ(1) described above changes in second and subsequent sweeps. When the corresponding relation does not changed, the information of address vs wavelength is not updated likewise the above method.

In addition, when the corresponding relation between the address value Am(i) and the known wavelength λ(i) changes, the wavelength information correction device 56 determines whether the change is a change of phase of a sweep, a change of amplitude, or a change including both of them.

Figure 10:
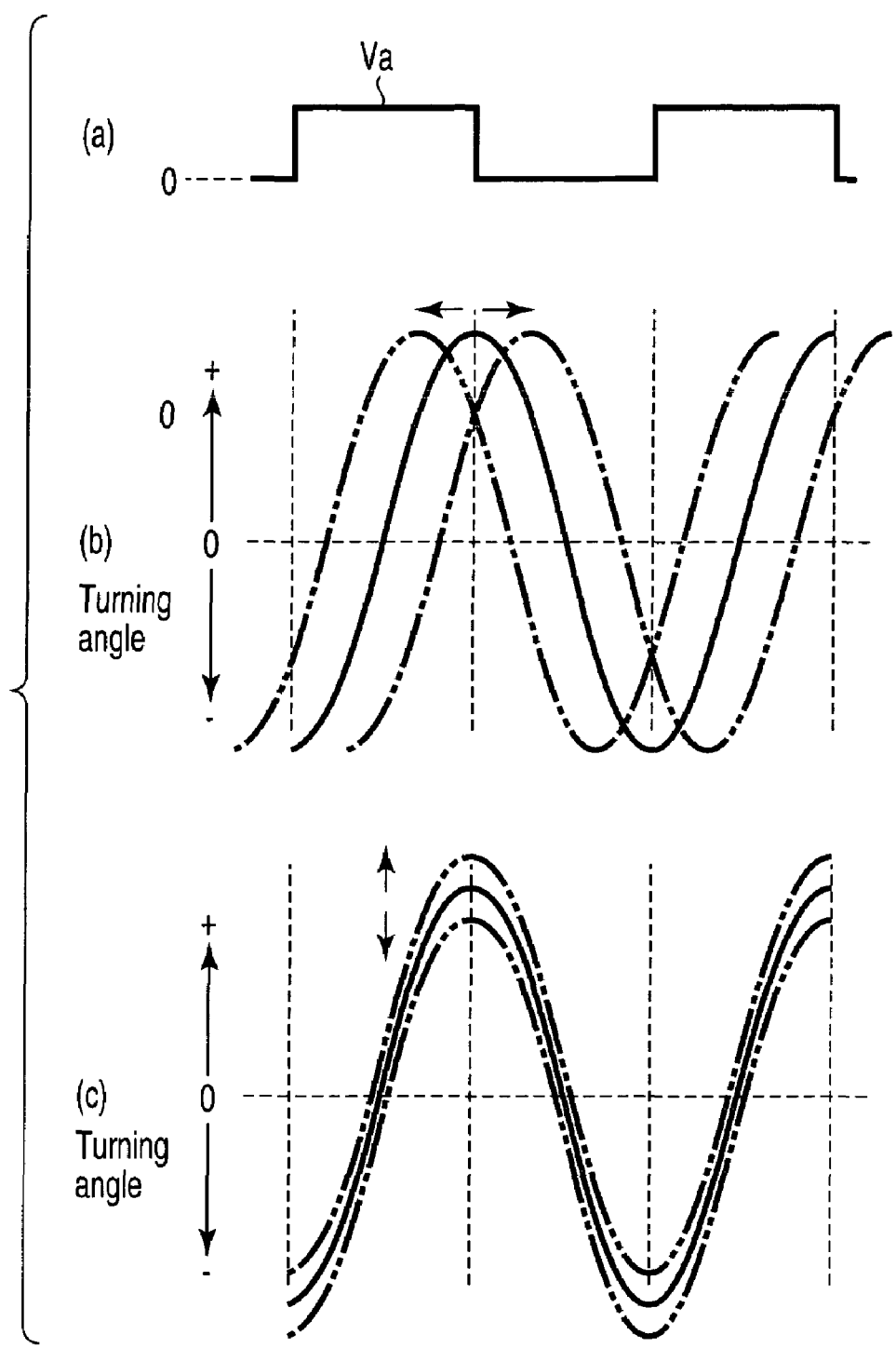
FIGS. 10A to 10C are views showing a modification of wavelength sweep characteristics of the drive signal to explain the wavelength information correction processing carried out by the wavelength correction device of the optical spectrum analyzer of FIG. 1.

The change of phase of the sweep means that the turning phase of the turning mirror 35 delays or advances in its entirety as shown in FIG. 10B with respect to the phase of the drive signal Va as shown in FIG. 10A.

The change of amplitude means that the turning amplitude of the turning mirror 35 increases or decreases as shown in FIG. 10C.

When, for example, the turning phase of the drive signal Va delays in its entirety with respect to the phase of the drive signal Va, the address values Am(i)' of the respective maximum points of the spectrum data of the reference light R are made larger than the original address values Am(i) in their entirety, respectively.

Further, when the turning amplitude of the turning mirror 35 increases with respect to the drive signal Va, the address values Am(i)' of the known wavelengths, which are longer than the wavelength at the center of sweep, of the address views Am(i)' of the respective maximum points of the spectrum data of the reference light R are made larger than the respective original address values Am(i), and the address values Am(i)' of the known wavelengths, which are shorter than the wavelength at the center of sweep are made smaller than the original address values Am(i).

Accordingly, when the respective address values Am(i)' obtained in the second and subsequent sweeps are made larger than the original address values Am(i) in their entirety, respectively, the wavelength information correction device 56 determines that a delay is caused in the turning phase of the turning mirror 35.

Then, the wavelength information correction device 56 carries out the feedback control to cause the address value Am, from which an average amount of increase of the address is subtracted, to be input from the address designation unit 55 to the first and second memories 53 and 54, so that the spectrum data of the reference light agrees with initial spectrum data at all times.

When the respective address values Am(i)' of the known wavelengths, which are obtained in the second and subsequent sweeps and are longer than the wavelength at the center of sweep, are larger than the original address values Am(i), respectively and when the respective address values Am(i)' of the known wavelengths, which are shorter than the wavelength at the center of sweep, are smaller than the original address values Am(i), respectively, the wavelength information correction device 56 determines that the turning amplitude of the turning mirror 35 increases.

The wavelength information correction device 56 carries out the feedback control to cause the drive signals Va, Vb having an amplitude, from which a voltage corresponding to a maximum amount of change of the address value is subtracted, to be input from the drive signal generator 49 to the turning mirror 35 so that the spectrum data of the reference light agrees with the initial spectrum data at all times.

Further, when the two phenomena occur at the same time, the wavelength information correction device 56 carries out the feedback control by carrying out the above processings together, so that the spectrum data as to the reference light agrees with the initial spectrum data at all times.

Although the feedback control described above has a slight delay as a waveform correction processing, it is advantageous in that it can cope with a sweep carried out at high speed because address interpolation processing need not be carried out every time the sweep is carried out.

Second Embodiment

Figure 11:
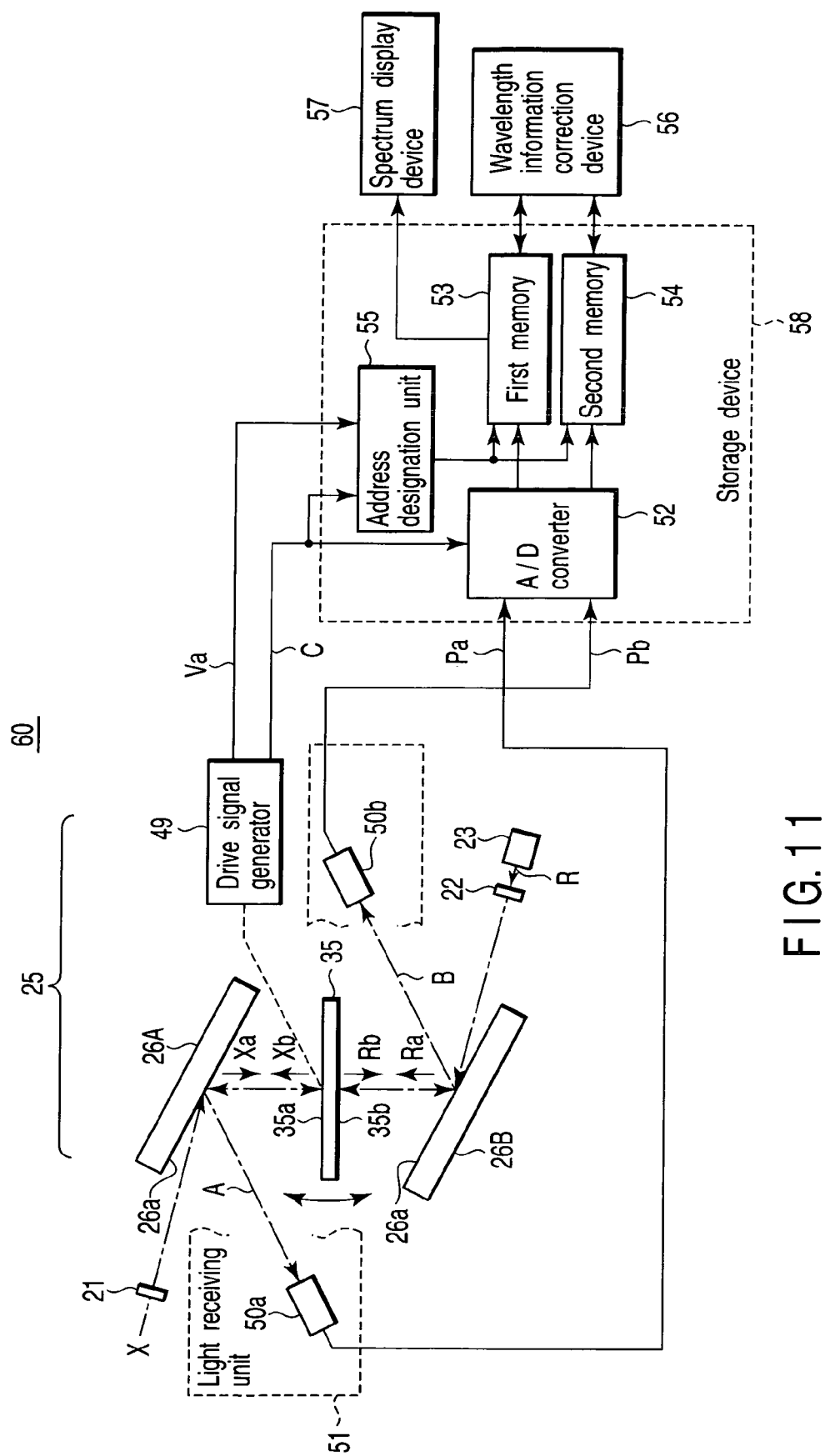
FIG. 11 is a block diagram shown to explain a configuration of an optical spectrum analyzer according to a second embodiment of the present invention.

FIG. 11 is a block diagram shown to explain a configuration of an optical spectrum analyzer 60 according to a second embodiment of the present invention.

Note that, in FIG. 11, the portions arranged similar to those of the optical spectrum analyzer 20 according to the first embodiment described above are denoted by the same reference numerals as those in FIG. 1 and the explanation thereof is omitted.

In the optical spectrum analyzer 20 according to the first embodiment of the invention described above, the reference light R and the to-be-measured light X are caused to be incident on the single diffraction grating 26 of the tunable wavelength filter 25.

However, the tunable wavelength filter 25 may be configured by using two diffraction gratings 26A and 26B as in the optical spectrum analyzer 60 according to the second embodiment of the invention shown in FIG. 11.

The first diffraction grating 26A receives to-be-measured light X incident thereon from a first light incident device 21 at a predetermined angle on a diffraction surface 26a, causes diffracted light Xa resulting from the to-be-measured light X to be incident on one reflection surface 35a of a turning mirror 35, receives return light Xb resulting from the diffracted light Xa, causes the return light Xb to exit therefrom in a first specific direction A, and causes it to be incident on a first light receiving unit 50a.

Further, the second diffraction grating 26B is arranged at a position determined by turning the first diffraction grating 26A 180° about the center of turn of the turning mirror 35.

The second diffraction grating 26B receives reference light R incident thereon from a second light incident device 22 at the above predetermined angle on a diffraction surface 26b, causes diffracted light Ra resulting from the reference light R to be incident on the other reflection surface 35b of the turning mirror 35, receives return light Rb resulting from the diffracted light Ra, causes the return light Rb to exit therefrom in a second specific direction B, and causes it to be incident on a second light receiving unit 50b.

Note that the both-surface-reflection type turning mirror 35 as described above can be realized by forming a hole at the center of the support substrate 40 shown in FIG. 7.

When the first and second diffraction gratings 26A and 26B are arranged at the position in point symmetry with respect to the center of turn of the turning mirror 35 as well as the incident angle of the to-be-measured light X to the first diffraction grating 26A is set to the same angle as the incident angle of the reference light R to the second diffraction grating 26B as in the optical spectrum analyzer 60 configured as described above, the wavelength of the to-be-measured light X incident on the first light receiving unit 50a is equal to that of the reference light R incident on the second light receiving unit 50b at all times when the turning mirror 35 turns.

That is, the optical spectrum analyzer 60 configured as described above is optically equivalent to the optical spectrum analyzer 20 according to the first embodiment.

Accordingly, even a wavelength information correction device 56 of the optical spectrum analyzer 60 configured as described above can correct the wavelength information of spectrum data of the to-be-measured light by an address value in which spectrum data of the reference light R is maximized (or minimized) and a known wavelength likewise the optical spectrum analyzer 20 according to the first embodiment.

Third Embodiment

Figure 12:
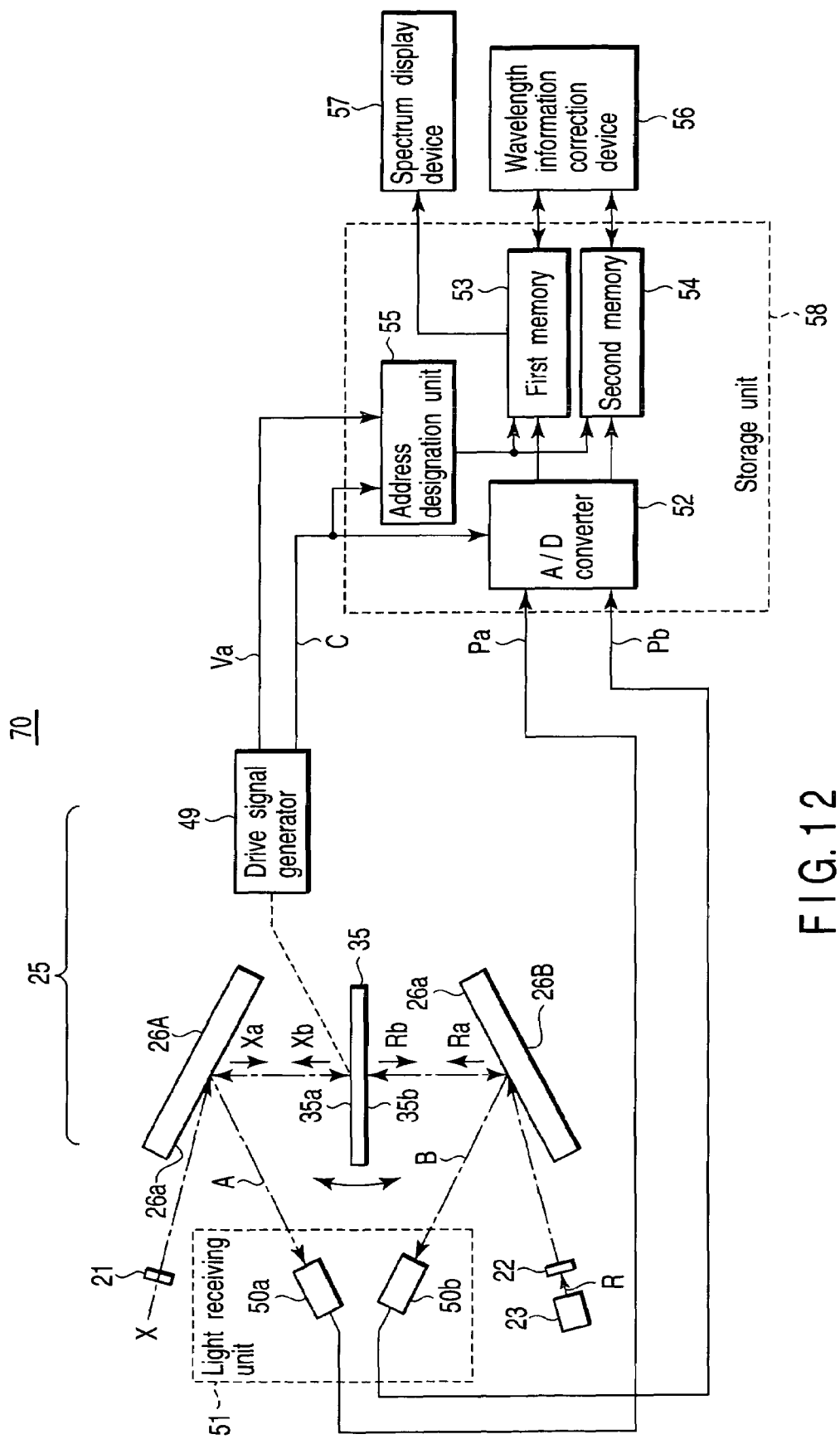
FIG. 12 is a block diagram shown to explain a configuration of an optical spectrum analyzer according to a third embodiment of the present invention.
Figure 13:
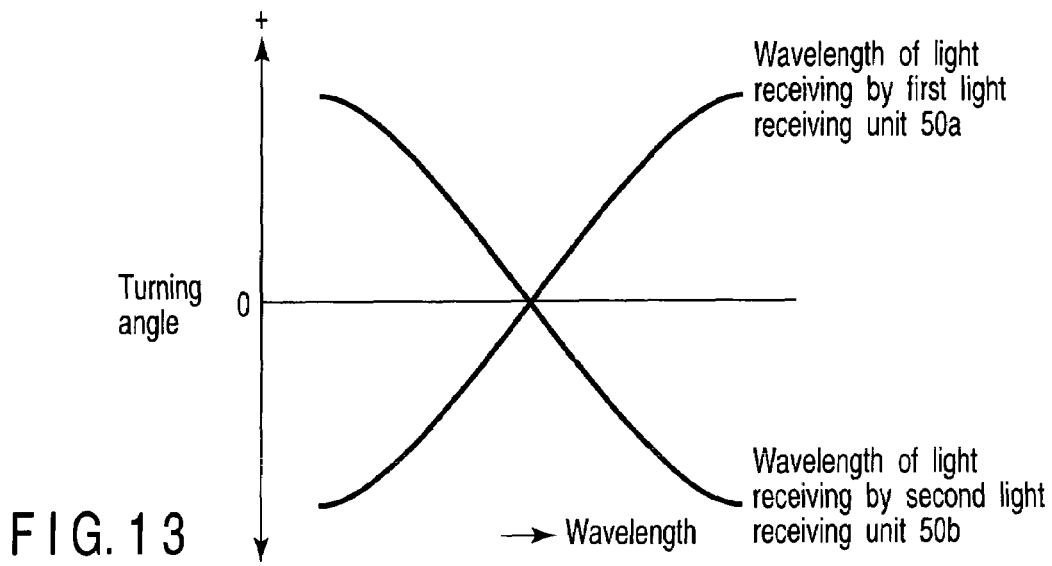
FIG. 13 is a view shown to explain the wavelength sweep characteristic according to the optical spectrum analyzer of FIG. 12.
Figure 15:
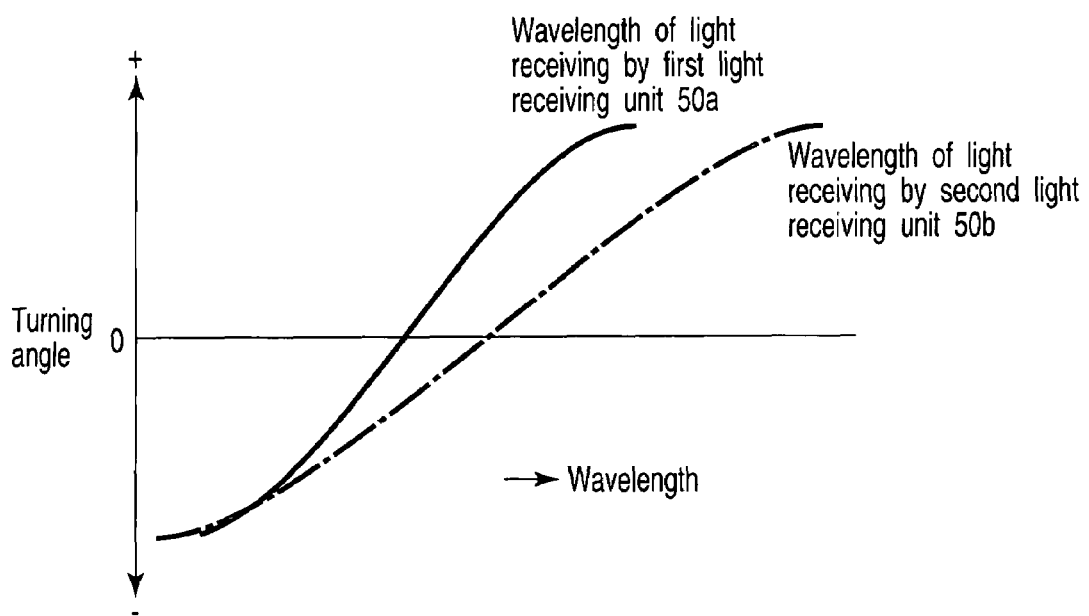
FIG. 15 is a view shown to explain wavelength sweep characteristic according to the optical spectrum analyzer of FIG. 14.
Figure 16:
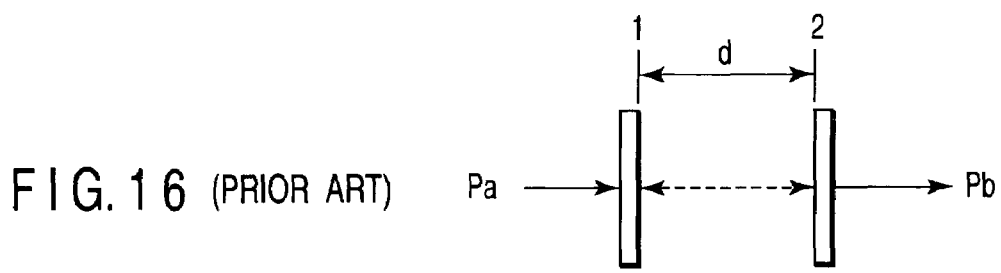
FIG. 16 is a view shown to explain a structure of a tunable wavelength filter composed of a Fairy-Perot filter for use in a conventional optical spectrum analyzer.
Figure 17:
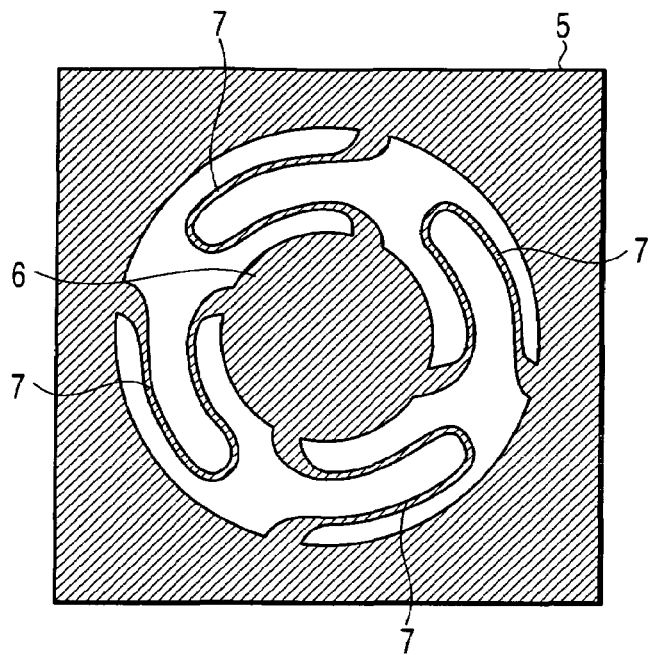
FIG. 17 is a plan view of a main portion of a conventional tunable wavelength filter to explain a structure of a moving mechanism formed by MEMS.
Figure 18:
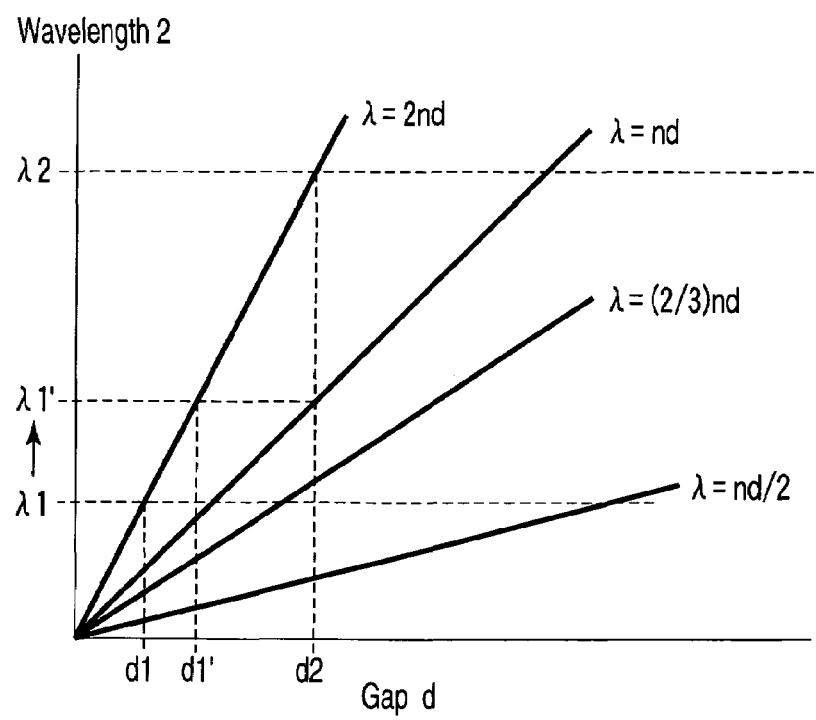
FIG. 18 is a view shown to explain a relation between wavelength and gap of the tunable wavelength filter composed of the Fairy-Perot filter of FIG. 16.

FIG. 12 is a block diagram shown to explain a configuration of an optical spectrum analyzer 70 according to a third embodiment of the present invention.

Note that, in FIG. 12, the portions configured similar to those of the optical spectrum analyzer 60 according to the second embodiment described above are denoted by the same reference numerals as those in FIGS. 1 and 11 and the explanation thereof is omitted.

When the two diffraction gratings 26A and 26B are used as in the optical spectrum analyzer 60 according to the second embodiment of the invention, the height of the turning mirror 35 can be reduced in an axial direction.

FIG. 12 shows a configuration example of the optical spectrum analyzer 70 in which two diffraction gratings 26A and 26B are arranged in plane symmetry.

The first diffraction grating 26A receives to-be-measured light X incident thereon from a first light incident device 21 at a predetermined angle on a diffraction surface 26a, causes diffracted light Xa resulting from the to-be-measured light X to be incident on one reflection surface 35a of a turning mirror 35, receives return light Xb resulting from the diffracted light Xa, causes the return light Xb to exit therefrom in a first specific direction A, and cases it to be incident on a first light receiving unit 50a.

Further, the second diffraction grating 26B is arranged at a position determined by turning the first diffraction grating 26A 180° about the center of turn of a turning mirror 35. The second diffraction grating 26B receives reference light R incident thereon from a second light incident device 22 at the predetermined angle on a diffraction surface 26b, causes diffracted light Ra resulting from the reference light R to be incident on the other reflection surface 35b of the turning mirror 35, receives return light Rb resulting from the diffracted light Ra, causes the return light Rb to exit therefrom in a second specific direction B, and causes it to be incident on a second light receiving unit 50b.

The incident angle of the to-be-measured light X on the first diffraction grating 26A is equal to the incident angle of the reference light R on the second diffraction grating 26B also in the optical spectrum analyzer 70 configured as described above.

However, in this case, the first and second diffraction gratings 26A, 26B are arranged at the positions in plane symmetry with respect to the turning mirror 35. Consequently, the first and second diffraction gratings 26A, 26B have such symmetry characteristics with respect to the center of turn of the turning mirror 35 that when the position of the turning mirror 35 is angularly changed, the wavelength of the light incident on the first light receiving unit 50a is swept in a direction opposite to the direction in which the wavelength of the light incident on the second light receiving unit 50b is swept.

Accordingly, a wavelength information correction device 56 can cause the spectrum data of the reference light R to correspond to the spectrum data of the to-be-measured light X by converting the respective address values of the spectrum data of the reference light R, that is, by subtracting the respective address values from an address maximum value M or carrying out a feedback-control for designating addresses to a first memory in the sequence from the address maximum value M to M-1, M-2, . . . , 0.

Then, the wavelength information of the spectrum data of the to-be-measured light can be calibrated by carrying out interpolation processing similar to the above one by the wavelength information correction device 56 after the address conversion processing is carried out.

Fourth Embodiment

Figure 14:
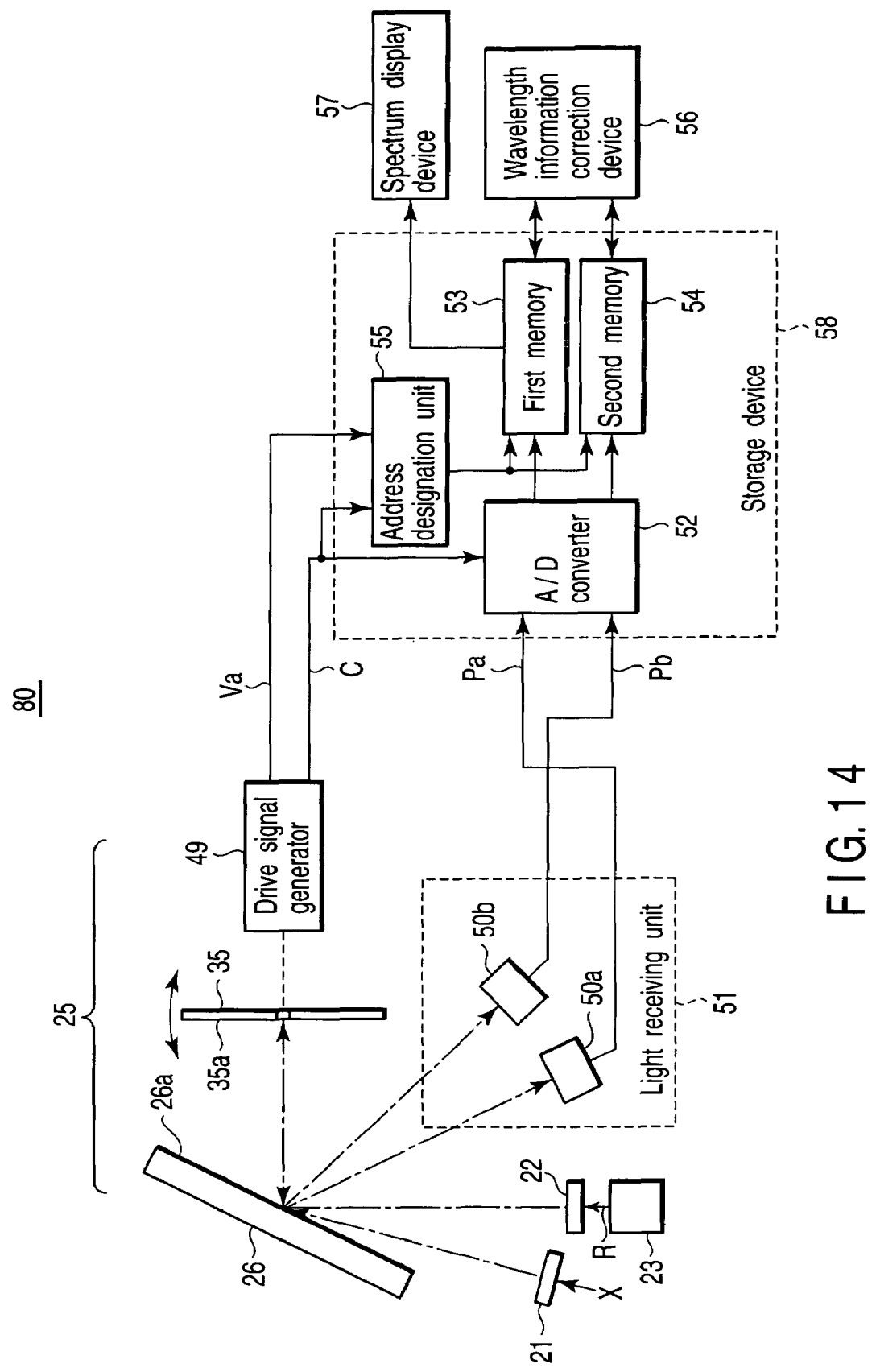

FIG. 14 is a block diagram shown to explain a configuration of an optical spectrum analyzer 80 according to a fourth embodiment of the present invention.

Note that, in FIG. 14, the portions configured similar to those of the optical spectrum analyzer 20 according to the first embodiment described above are denoted by the same reference numerals as those in FIG. 1 and the explanation thereof is omitted.

In the respective embodiments described above, the incident angle of the reference light R to the diffraction grating is equal to the incident angle of the to-be-measured light X to the diffraction grating.

However, the incident angle of the reference light R to the diffraction grating 26 may be different from the incident angle of the to-be-measured light X to the diffraction grating 26 as in the optical spectrum analyzer 80 according to the fourth embodiment of the invention shown in FIG. 14.

However, in this case, the wavelength sweep characteristics of the light incident on the a first light receiving unit 50a are different from those of the light incident on a second light receiving unit 50b with respect to the angular change of the turning mirror 35.

A center of a wavelength sweep depends on a position of the light receiving unit and an extent of the wavelength sweep depends on an incident angle of light incident on the diffraction grating. Thus, it is assumed that a wavelength information correction device 56 previously sets a wavelength sweep range of the reference light so as to include a wavelength sweep range of the to-be-measured light.

Then, it is assumed that the wavelength information correction device 56 causes the reference light R to be incident thereon in place of the to-be-measured light and determines an expression for relating the wavelength of spectrum data of the reference light R obtained from an output from the first light receiving unit 50a to the wavelength of spectrum data of the reference light R obtained from an output from the second light receiving unit 50b.

With this operation, when the waveform information of the spectrum data of the reference light R changes in a state in which the to-be-measured light X is incident, the wavelength information correction device 56 calibrates the wavelength information of the spectrum data of the to-be-measured light X from the above change and the above expression.

Note that the respective embodiments described above show the example in which the to-be-measured light is incident from one set of the to-be-measured light incident means, the to-be-measured light may be incident from a multi-channels.

When the multi-channels are employed, the sweep ranges of the respective channels may be not only set equal to each other but also set different from each other. In any of the cases, the wavelength information of the respective channels can be correctly captured by causing the reference light R to be incident at all times as in the respective embodiments described above.

Therefore, as described above in detail, according to the present invention, the to-be-measured light is measured while carrying out the calibration processing for correcting the wavelength information based on the spectrum data obtained by causing the reference light whose wavelength is known to be incident on the tunable wavelength filter together with the to-be-measured light in order to overcome the problems of the prior arts described above. Consequently, there can be provided the optical spectrum analyzer that can continuously measure the to-be-measured light in the wide wavelength range at high speed while maintaining high wavelength accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical spectrum analyzer comprising:
   a reference light source which radiates reference light having a known wavelength of maximum or minimum light intensity;
   a tunable wavelength filter which causes wavelength components contained in incident light to selectively exit therefrom and which changes the selected wavelength as time passes, wherein the incident light contains to-be-measured light from an external source thereof and the reference light radiated from the reference light source, and wherein the tunable wavelength filter includes: (i) a diffraction grating which receives the to-be-measured light and the reference light in a direction orthogonal to grooves of a diffraction surface of the diffraction grating and diffracts the to-be-measured light and the reference light, and (ii) a turning mirror having a reflection surface that confronts the diffraction surface of the diffraction grating, the turning mirror being formed to freely turn about an axis parallel to the grooves of the diffraction surface such that when the reflection surface of the turning mirror confronts the diffraction surface of the diffraction grating, the turning mirror receives diffracted light exiting from the diffraction grating in response to the to-be-measured light and to the reference light on the reflection surface and returns the diffracted light to the diffraction grating;
   light incident devices which cause the to-be-measured light to be directly incident, as a light component of the incident light, on the tunable wavelength filter along a first optical axis and which at the same time cause the reference light from the reference light source to be directly incident, as another light component of the incident light, on the tunable wavelength filter along a second optical axis different from the first optical axis;
   a light receiving device which simultaneously receives light, which results from the to-be-measured light and is caused to exit from the tunable wavelength filter, and light, which results from the reference light and is caused to exit from the tunable wavelength filter as well as simultaneously outputs an output signal in response to the to-be-measured light and an output signal in response to the reference light, wherein the light receiving device includes: (i) a first light receiving unit for receiving light exiting from the diffraction grating in a first specific direction in response to light resulting from the to-be-measured light and returned from the turning mirror of the tunable wavelength filter, and (ii) a second light receiving unit for receiving light exiting from the diffraction grating in a second specific direction in response to light resulting from the reference light and returned from the turning mirror of the tunable wavelength filter;
   a storage device which has a first memory and a second memory, and which stores spectrum data of the to-be-measured light and spectrum data of the reference light in respective predetermined portions of the first and second memories, the predetermined portions of the first and second memories having predetermined addresses, and the spectrum data being stored based on the output signals in response to the to-be-measured light and the reference light which are simultaneously output from the first and second light receiving units of the light receiving device, wherein the spectrum data is made to correspond to the wavelength that is selected by the tunable wavelength filter and changes as time passes; and
   a correction device which corrects the spectrum data of the to-be-measured light stored in the predetermined portion of the first memory of the storage device by using address values at which the spectrum data of the reference light stored in the predetermined portion of the second memory of the storage device is maximized or minimized, and known wavelengths corresponding to the address values, the spectrum data being corrected based on a wavelength that is selected by the tunable wavelength filter and changes as time passes;
   wherein the optical spectrum analyzer is arranged to continuously measure the to-be-measured light and in a wide wavelength range at a high speed while maintaining a high wavelength accuracy and without requiring an advance calibration processing to be performed, the optical spectrum analyzer performing measurement of the to-be-measured light accompanied by calibration processing of the correction devices for correcting wavelength information regarding the to-be-measured light based on the spectrum data of the to-be-measured light and the spectrum data of the reference light, which are obtained by causing the reference light having the known wavelength and the to-be-measured light to be incident on the tunable wavelength filter at all times; and
   wherein the turning mirror has reflection surfaces formed on both surface sides, and
   the diffraction grating comprises:
      a first diffraction grating which receives the to-be-measured light incident thereon from a first light incident unit of the light incident devices and causes diffracted light resulting from the to-be-measured light on the one surface side of the turning mirror; and a second diffraction grating which receives the reference light incident thereon from a second light incident unit of the light incident devices and causes diffracted light resulting from the reference light to be incident on the opposite surface side of the turning mirror.

2. An optical spectrum analyzer comprising:

a reference light source which radiates reference light having a known wavelength of maximum or minimum light intensity;

a tunable wavelength filter which causes wavelength components contained in incident light to selectively exit therefrom and which changes the selected wavelength as time passes, wherein the incident light contains to-be-measured light from an external source thereof and the reference light radiated from the reference light source, and wherein the tunable wavelength filter includes: (i) a diffraction grating which receives the to-be-measured light and the reference light in a direction orthogonal to grooves of a diffraction surface of the diffraction grating and diffracts the to-be-measured light and the reference light, and (ii) a turning mirror having a reflection surface that confronts the diffraction surface of the diffraction grating, the turning mirror being formed to freely turn about an axis parallel to the grooves of the diffraction surface such that when the reflection surface of the turning mirror confronts the diffraction surface of the diffraction grating, the turning mirror receives diffracted light exiting from the diffraction grating in response to the to-be-measured light and to the reference light on the reflection surface and returns the diffracted light to the diffraction grating;

light incident devices which cause the to-be-measured light to be directly incident, as a light component of the incident light, on the tunable wavelength filter along a first optical axis and which at the same time cause the reference light from the reference light source to be directly incident, as another light component of the incident light, on the tunable wavelength filter along a second optical axis different from the first optical axis;

a light receiving device which simultaneously receives light, which results from the to-be-measured light and is caused to exit from the tunable wavelength filter, and light, which results from the reference light and is caused to exit from the tunable wavelength filter as well as simultaneously outputs an output signal in response to the to-be-measured light and an output signal in response to the reference light, wherein the light receiving device includes: (i) a first light receiving unit for receiving light exiting from the diffraction grating in a first specific direction in response to light resulting from the to-be-measured light and returned from the turning mirror of the tunable wavelength filter, and (ii) a second light receiving unit for receiving light exiting from the diffraction grating in a second specific direction in response to light resulting from the reference light and returned from the turning mirror of the tunable wavelength filter;

a storage device which has a first memory and a second memory, and which stores spectrum data of the to-be-measured light and spectrum data of the reference light in respective predetermined portions of the first and second memories, the predetermined portions of the first and second memories having predetermined addresses, and the spectrum data being stored based on the output signals in response to the to-be-measured light and the reference light which are simultaneously output from the first and second light receiving units of the light receiving device, wherein the spectrum data is made to correspond to the wavelength that is selected by the tunable wavelength filter and changes as time passes; and a correction device which corrects the spectrum data of the to-be-measured light stored in the predetermined portion of the first memory of the storage device by using address values at which the spectrum data of the reference light stored in the predetermined portion of the second memory of the storage device is maximized or minimized, and known wavelengths corresponding to the address values, the spectrum data being corrected based on a wavelength that is selected by the tunable wavelength filter and changes as time passes;

wherein the optical spectrum analyzer is arranged to continuously measure the to-be-measured light and in a wide wavelength range at a high speed while maintaining a high wavelength accuracy and without requiring an advance calibration processing to be performed, the optical spectrum analyzer performing measurement of the to-be-measured light accompanied by calibration processing of the correction devices for correcting wavelength information regarding the to-be-measured light based on the spectrum data of the to-be-measured light and the spectrum data of the reference light, which are obtained by causing the reference light having the known wavelength and the to-be-measured light to be incident on the tunable wavelength filter at all times;

wherein the turning mirror has:
 a mirror main body;
 fixed substrates;
 torsion bars which couple between the edges of the fixed substrates and the outside edges of the mirror main body, the torsion bars being twisted and deformed in a lengthwise direction, and turnably supporting the mirror main body; and
 turning means for turning the mirror main body; and wherein the turning mirror has reflection surfaces formed on both surface sides, and the diffraction grating comprises:
 a first diffraction grating which receives the to-be-measured light incident thereon from a first light incident unit of the light incident devices and causes diffracted light resulting from the to-be-measured light to be incident on the one surface side of the turning mirror; and
 a second diffraction grating which receives the reference light incident thereon from a second light incident unit of the light incident devices and causes diffracted light resulting from the reference light to be incident on the opposite surface side of the turning mirror.

3. An optical spectrum analyzer according to claim 1, wherein the reference light source comprises:

a wide band light source which radiates wide band light; and a filter which receives the wide band light from the wide band light source and extracts a plurality of light components whose peak level wavelengths are known.

4. An optical spectrum analyzer according to claim 2, wherein the reference light source comprises:

a wide band light source which radiates wide band light; and a filter which receives the wide band light from the wide band light source and extracts a plurality of light components whose peak level wavelengths are known.

5. An optical spectrum analyzer according to claim 1, wherein the reference light source comprises:
   a wide band light source which radiates wide band light; and
   a gas absorption cell which receives the wide band light from the wide band light source, absorbs light having a known wavelength, and causes the light to exit therefrom.

6. An optical spectrum analyzer according to claim 2, wherein the reference light source comprises:
   a wide band light source which radiates wide band light; and
   a gas absorption cell which receives the wide band light from the wide band light source, absorbs light having a known wavelength, and causes the light to exit therefrom.

7. An optical spectrum analyzer according to claim 1, wherein the reference light source comprises:
   a plurality of narrow band light sources which radiate a plurality of single wavelength light beams having respective known wavelengths; and
   a light coupler which couples the single wavelength light beams radiated from said plurality of narrow band light sources and causes a coupled light to exit therefrom.

8. An optical spectrum analyzer according to claim 2, wherein the reference light source comprises:
   a plurality of narrow band light sources which radiate a plurality of single wavelength light beams having respective known wavelengths; and
   a light coupler which couples the single wavelength light beams radiated from said plurality of narrow band light sources and causes a coupled light to exit therefrom.

9. An optical spectrum analyzer according to claim 1, wherein the storage device includes:
   an analog/digital (A/D) converter which converts first and second intensity signals, which are output from the first and second light receiving units in correspondence to the intensities of respective incident light beams, to first and second digital signal trains;
   first and second memories which store the first and second digital signal trains converted by the A/D converter in time series; and
   an address designation unit which designates address values to the first and second memories, wherein the address destination unit counts the number of clock signals from a timing at which a drive signal that drives the tunable wavelength filter rises to a timing at which it falls, and outputs a result of count as the address values.

10. An optical spectrum analyzer according to claim 2, wherein the mirror main body constituting the turning mirror, the fixed substrates, and the torsion bars are formed by a micro-electro-mechanical-systems (MEMS) for subjecting a single semiconductor substrate to etching processing.

11. An optical spectrum analyzer according to claim 2, wherein the storage device includes:
   an analog/digital (A/D) converter which converts first and second intensity signals, which are output from the first and second light receiving units in correspondence to the intensities of respective incident light beams, to first and second digital signal trains;
   first and second memories which store the first and second digital signal trains converted by the A/D converter in time series; and
   an address designation unit which designates address values to the first and second memories, wherein the address destination unit counts the number of clock signals from a timing at which a drive signal that drives the tunable wavelength filter rises to a timing at which it falls, and outputs a result of count as the address values.

* * * * *